United States Patent
Yagi et al.

(10) Patent No.: US 8,922,075 B2
(45) Date of Patent: Dec. 30, 2014

(54) ELECTRIC MOTOR HAVING SUPPORT SURFACES FOR MAINTENANCE

(71) Applicant: Kabushiki Kaisha Toshiba, Tokyo (JP)

(72) Inventors: Nobuyuki Yagi, Nishitama-gun (JP); Satoru Murakami, Higashikurume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/293,744

(22) Filed: Jun. 2, 2014

(65) Prior Publication Data

US 2014/0265737 A1    Sep. 18, 2014

Related U.S. Application Data

(60) Division of application No. 13/586,446, filed on Aug. 15, 2012, now Pat. No. 8,786,148, which is a continuation of application No. PCT/JP2011/053541, filed on Feb. 18, 2011.

(30) Foreign Application Priority Data

Feb. 19, 2010   (JP) ................. 2010-035408

(51) Int. Cl.
  *H02K 9/00* (2006.01)
  *H02K 5/00* (2006.01)
  *H02K 7/08* (2006.01)
  *H02K 5/16* (2006.01)
(52) U.S. Cl.
  CPC ........................... *H02K 5/16* (2013.01)
  USPC ............... 310/63; 310/90; 310/60 R; 310/425

(58) Field of Classification Search
  CPC ........... H02K 9/06; H02K 1/185; H02K 5/20; H02K 9/10
  USPC ................. 310/63, 88, 91, 90, 60 R
  See application file for complete search history.

(56) References Cited

U.S. PATENT DOCUMENTS

| | | |
|---|---|---|
| 1,794,663 A | 3/1931 | Anderson |
| 2,644,099 A | 6/1953 | Ludwig et al. |
| 7,459,817 B2 | 12/2008 | Van Luik et al. |
| 7,462,964 B2 | 12/2008 | Nagayama et al. |
| 2006/0226717 A1 | 10/2006 | Nagayama et al. |
| 2006/0261687 A1 | 11/2006 | Nagayama et al. |
| 2012/0062057 A1 | 3/2012 | Nagayama et al. |
| 2012/0062076 A1 | 3/2012 | Nagayama et al. |

FOREIGN PATENT DOCUMENTS

CN    1848620    10/2006
(Continued)

OTHER PUBLICATIONS

Chinese Office Action issued in Chinese Application No. 201180009990.X on Feb. 26, 2014.

(Continued)

*Primary Examiner* — Terrance Kenerly
(74) *Attorney, Agent, or Firm* — Oblon, Spivak, McClelland, Maier & Neustadt, L.L.P.

(57) ABSTRACT

According to one embodiment, an electric motor includes a stator, a rotor, bearings and a rotor shaft, in a frame, supporting surfaces on the rotor, and a plurality of threaded holes in the frame, which are configured to receive bolts for pressing the support surfaces from outside.

3 Claims, 6 Drawing Sheets

(56) References Cited

FOREIGN PATENT DOCUMENTS

| | | |
|---|---|---|
| JP | 54-49524 U | 4/1979 |
| JP | 56-89668 U | 7/1981 |
| JP | 2006-271081 | 5/2006 |
| JP | 2008-029150 | 2/2008 |
| JP | 2008-099491 | 4/2008 |
| JP | 2009-107790 | 5/2009 |

OTHER PUBLICATIONS

International Preliminary Report on Patentability issued in PCT/JP2011/053541 on Sep. 27, 2012.
Written Opinion of the International Searching Authority issued in PCT/JP2011/053541 on May 24, 2011.
International Search Report issued in PCT/JP2011/053541 on May 24, 2011.
Search Report issued Sep. 18, 2014 in the European Patent Application No. 11744761.5-1804.

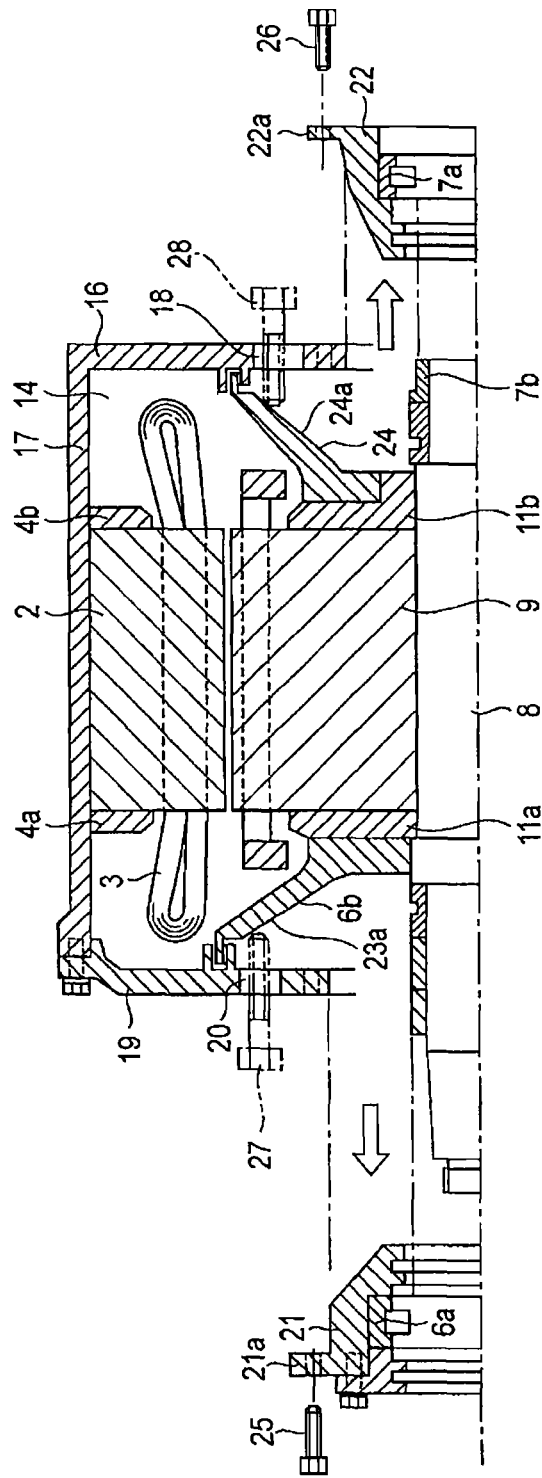
F I G. 3

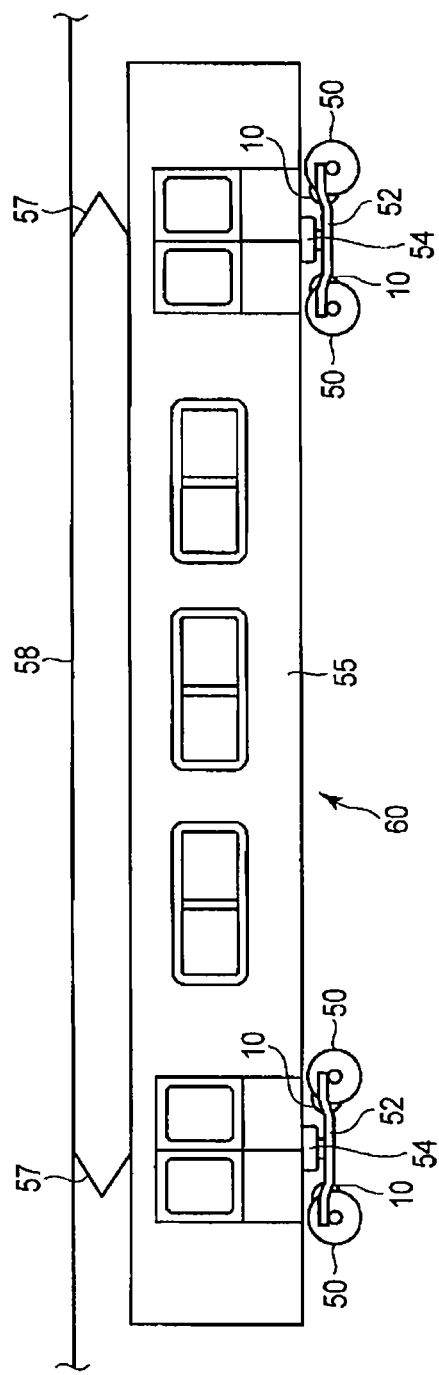

ELECTRIC MOTOR HAVING SUPPORT SURFACES FOR MAINTENANCE

CROSS-REFERENCE TO RELATED APPLICATIONS

This application is a Division of U.S. application Ser. No. 13/586,446 filed Aug. 15, 2012, which is a Continuation Application of PCT Application No. PCT/JP2011/053541 filed Feb. 18, 2011, and based upon and claiming the benefit of priority from Japanese Patent Application No. 2010-035408 filed Feb. 19, 2010, the entire contents of all of which are incorporated herein by reference.

FIELD

Embodiments described herein relate generally to an electric motor for driving a vehicle, for example, for driving a railway vehicle.

BACKGROUND

A driving device for a vehicle, for example, a driving device for a railway vehicle includes traction electric motors provided respectively in a truck near wheels and a controlling device that controls these traction electric motors. Output shafts of the traction electric motors are connected to the wheels via series of gears, and drive the wheels. The driving electric motor conventionally has a self-ventilation cooling structure in which cooling is performed by flowing external air inside thereof, and bearings supporting the rotation shafts are lubricated by lubricant grease.

Since the electric motors for the railway vehicle are installed in the trucks, there are quite a few cases in which they are exposed to foreign substances from outside such as dust, rain, snow, and the like. Due to this, the electric motors require periodic maintenance that accompanies disassembly, and cleaning of the insides of the devices that have been contaminated by the foreign substances from the outside is highly recommended.

On the other hand, needs to elongate a maintenance cycle, that is, needs for electric motors which can reduce the number of times of maintenance are increasing. In order to meet such needs, a development of a fully enclosed type electric motor is under progress.

Each of such electric motors includes a stator core provided on an inner circumferential side of a cylindrical frame and having a stator coil, and a bracket and a housing attached to both sides of the frame and configuring a sealed casing, and a bearing is internally provided respectively in these bracket and housing. A rotor shaft extends inside the sealed casing, and both end portions thereof are rotatably supported by the bearings. A rotor core is attached to a center portion of the rotor shaft, and is positioned at an inner side of the stator core. Further, a partition plate is attached to each end portion of the rotor shaft inside the sealed casing, and an outer periphery of each partition plate forms a labyrinth seal portion.

The electric motors configured as described above are the fully enclosed type motors, and since external air does not flow inside thereof, the interior of the motor is not contaminated by dust, so labor therefore can be saved by omitting the disassembly of the electric motors for cleaning the insides thereof.

However, since the bearings are lubricated by grease filled in bearing portions, the lubricant grease deteriorated by the operation, and the lubricant grease needs to be renewed. The renewal of the lubricant grease needs to be performed after having disassembled the electric motors, by which large amounts of labor and time were required.

For example, a rotor suspending jig is set to each shaft end of the rotor shaft, and after having detached the bracket and the housing from the frame, an entirety of the rotor in a state of still having the bearings attached is drawn out from the frame in an axial direction. Thereafter, the bracket and the housing are drawn out from the rotor, and the grease of the bearing portions is replaced with a new one. After replacing the grease, the rotor is inserted into the frame in an opposite order and is coaxially aligned, and thus the electric motor is reassembled.

As aforementioned, although the cleaning of the inside due to contamination becomes unnecessary by forming the electric motors as the fully enclosed type, the disassembly and reassembly of the electric motors need to be performed periodically in order to renew the bearing lubricant grease, and this is requiring large amounts of labor and time. Further, replacements of the bearings become necessary due to long-term use, wear, and the like, and at such occasions, the electric motors need to be disassembled.

BRIEF DESCRIPTION OF THE DRAWINGS

FIG. 3 is a cross sectional view of the electric motor showing a process of disassembling the electric motor of the first embodiment.

FIG. 10 is a side view of a railway vehicle having electric motors.

DETAILED DESCRIPTION

Figure 1:
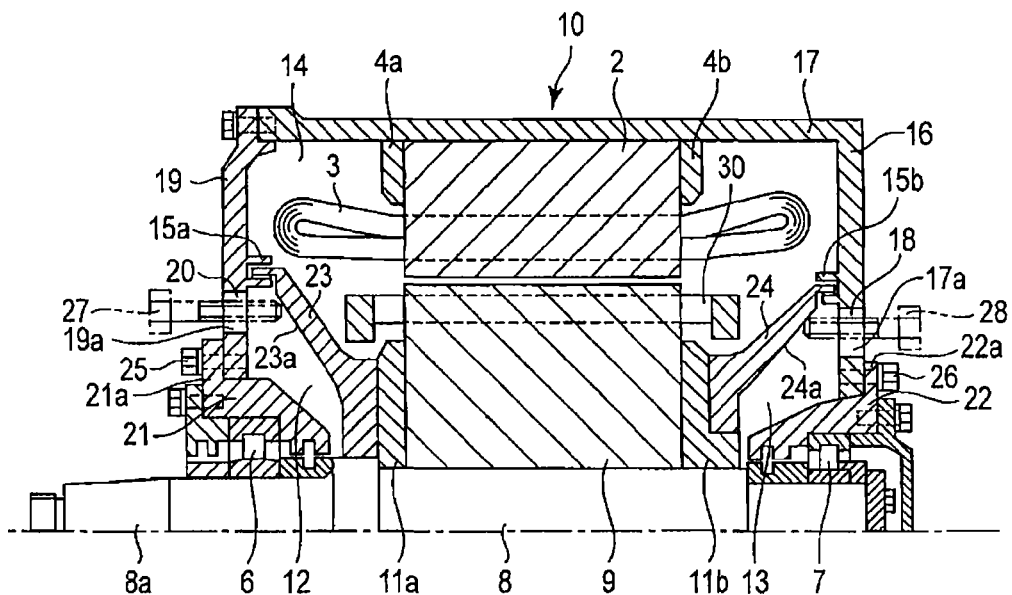
FIG. 1 is a cross sectional view showing an electric motor of a first embodiment.

In general, according to one embodiment, an electric motor comprises a stator, a rotor, bearings and a rotor shaft, in a frame; supporting surfaces on the rotor; and a plurality of threaded holes in the frame, configured to receive bolts for pressing the support surfaces from outside.

An electric motor for driving a vehicle according to various embodiments will be described in detail with reference to the drawings.

Firstly, a railway vehicle comprising electric motors will be explained. FIG. 10 schematically shows the railway vehicle. This railway vehicle 60 includes a pair of truck frames 52 in each of which wheels 50 are provided, and a vehicle body 55 supported via air springs 54 on the truck frames. On each truck frame 52 and near the wheels 50, electric motors 10 that function as traction electric motors are mounted. The electric motors 10 are connected so as to be capable of transmitting the rotation force to the wheels 50 via couplings and gear boxes not shown. The wheels 50 are mounted on rails not shown. A structure configured of the wheels 50, the truck frames 52, and the air springs 54 will collectively be termed a truck.

Pantographs 57 are provided on a ceiling slide of the vehicle body 55, and these pantographs are in contact with an overhead power line 58. Electric power supplied from the overhead power line 58 to the pantographs 57 is supplied to a controlling device not shown. The electric power is converted from direct current to alternating current by the controlling device, and is supplied to respective electric motors 10 through wirings not shown. The electric motors 10 operate by using the supplied electric power, and rotate the wheels 50 via the couplings and the gear boxes. Due to this, the vehicle body 55 runs on the rails.

Next, the electric motors according to the embodiments will be explained.

First Embodiment

Figure 2:
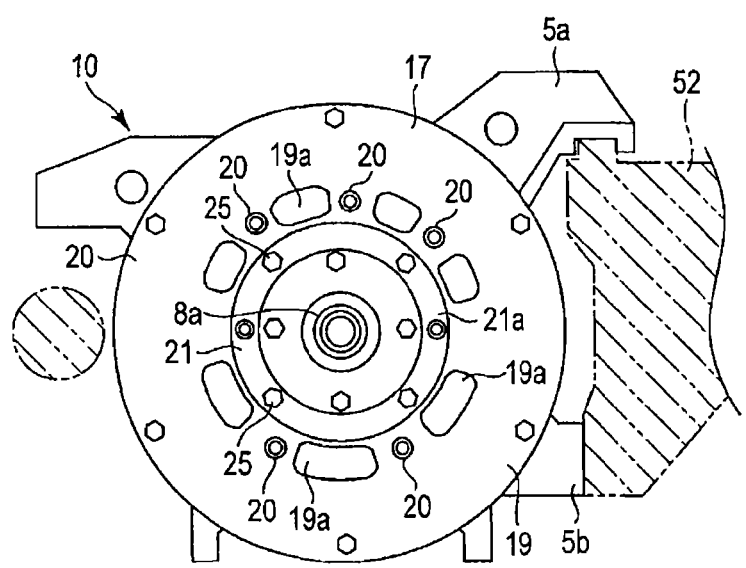
FIG. 2 is a front view of the electric motor of the first embodiment.

FIG. 1 is a longitudinal cross sectional view showing a fully enclosed type electric motor according to the first embodiment, and FIG. 2 is a front view showing a driving side of the electric motor. As shown in FIG. 1 and FIG. 2, the electric motor 10 includes a cylindrical frame 17. One end of the frame 17 in an axial direction is closed by an annular end plate 16, and the other end of the frame 17 in the axial direction is closed by an annular bracket 19 bolt-fixed to the frame. The end plate 16 is integrally formed with the frame 17. A case (device body) whose inside is sealed is configured by these frame 17, end plate 16, and bracket 19.

A cylindrical stator core 2 is fixed concentrically with the frame 17 on an inner circumferential surface of the frame 17. A pair of annular core holders 4a and 4b is fixed to both end surfaces of the stator core 2. The stator core 2 is configured by stacking a plural of annular metal plates made of a ferromagnetic material, for example, silicon steel plates. A plurality of slots extending respectively in the axial direction are formed at an inner circumferential portion of the stator core 2, and stator coils 3 are embedded in these slots. Coil ends of the stator coils 3 project in the axial direction from the both end surfaces of the stator core 2. The stator core 2 and stator coils 3 constitute a stator (stationary part).

An opening is formed at a center portion of the bracket 19, and a first bearing housing 21 is fitted into this opening from outside. A flange portion 21a of the first bearing housing 21 is bolt-fixed to an outer surface of the bracket 19 by a plurality of bolts 25 from the outside, and due to this, the first bearing housing 21 is fixed to the bracket 19. A first bearing 6 is internally provided in the first bearing housing 21. A lubricant grease is filled in the first bearing 6.

An opening is formed at a center portion of the end plate 16 of the frame 17, and a second bearing housing 22 is fitted into this opening from the outside. A flange portion 22a of the second bearing housing 22 is bolt-fixed to the outer surface of the end plate 16 by a plurality of bolts 26 from the outside, and due to this, the second bearing housing 22 is fixed to the end plate 16. A second bearing 7 is internally provided in the second bearing housing 22. A lubricant grease is filled in the second bearing 7.

A columnar rotor core 9 is arranged inside the stator core 2 coaxially with the stator core with a space therebetween. A rotor shaft 8 is attached to a center portion of the rotor core 9 configuring a rotor, and both axial end portions of the rotor shaft 8 are rotatably supported by the first bearing 6 and the second bearing 7. An outer race of the first bearing 6 fits with an inner circumference of the first bearing housing 21, and an inner race thereof fits with an outer circumference of the rotor shaft 8. An outer race of the second bearing 7 fits with an inner circumference of the second bearing housing 22, and an inner race thereof fits with the outer circumference of the rotor shaft 8. Due to this, the rotor shaft 8 extends coaxially in the case. A driving side end portion 8a of the rotor shaft 8 extends to outside the device, and a joint for connecting a driving gear device is attached to the end portion.

The rotor core 9 is configured by stacking a plural of annular metal plates made of a ferromagnetic material, for example, silicon steel plates. The rotor core 9 is supported and sandwiched from both sides in the axial direction by a pair of core holders 11a and 11b attached to the rotor shaft 8. The core holder 11a and 11b are arranged annularly, and the outer diameter thereof is formed slightly smaller than the outer diameter of the rotor core 9.

A plurality of grooves respectively extending in the axial direction is formed on an outer circumferential portion of the rotor core 9, and a rotor bar 30 is embedded in each groove. Both end portions of the respective rotor bars 30 extend outside from the rotor core 9, and a basket-shaped rotor of the induction electric motor is formed by integrally connecting the extended portions by an end ring. By electrically conducting the stator coil 3, the rotor core 9 is inducted and rotated, and the rotor shaft 8 is rotated together with the rotor core 9.

A first separating plate 23 is attached to the rotor shaft 8 coaxially between the first bearing 6 and the rotor core 9, and is configured integrally rotatable with the rotor shaft 8. The first separating plate 23 is formed in a substantially funnel shape, and extends tiltingly from a rotor core 9 side toward the bracket 19. An outer circumferential edge portion of the first separating plate 23 and an inner circumferential portion of an extended portion of the bracket 19 on a device inner side are engaged with one another with a minute annular space therebetween. This minute annular space portion is formed in a two-layer structure having a concavo-convex shape, and forms a labyrinth structure portion 15a.

A second separating plate 24 is coaxially attached to the rotor shaft 8 between the second bearing 7 and the rotor core 9, and is configured integrally rotatable with the rotor shaft 8. The second separating plate 24 is formed in a substantially funnel shape, and extends tiltingly from the rotor core 9 side toward the end plate 16. An outer circumferential edge portion of the second separating plate 24 and an inner circumferential portion of an extended portion of the end plate 16 on the device inner side are engaged with one another with a minute annular space therebetween. This minute annular space portion is formed in a two-layer structure having a concavo-convex shape, and forms a labyrinth structure portion 15b.

The first separating plate 23 and the second separating plate 24 form a sealed space 14 inside the case via the labyrinth structure portions 15a and 15b. The stator core 2 and the rotor core 9 are arranged inside the sealed space 14.

As shown in FIG. 1 and FIG. 2, an annular external air flowing space 12 coaxial with the rotor shaft 8 is formed between the first separating plate 23, the bracket 19, and the first bearing housing 21, and the external air flowing space 12 communicates with a space outside the device through a plurality of ventilating openings 19a provided in the bracket 19. An annular external air flowing space 13 coaxial with the rotor shaft 8 is formed between the second separating plate 24, the end plate 16, and the second bearing housing 22, and the external air flowing space 13 communicates with the space outside the device thorough a plurality of ventilating openings 17a provided in the end plate 16.

A supporting surface for supporting the rotor is formed on at least a part of a supporting body that is fixed to the rotor shaft 8 and rotates integrally with the rotor core 9. In the present embodiment, the first separating plate 23 and the second separating plate 24 respectively configure the supporting body. A tapered surface 23a having the rotor shaft 8 as a center is formed at least at a part of a side surface on an outside of the first separating plate 23. This tapered surface 23a configures a supporting surface. In the present embodiment, although the tapered surface 23a is formed continuingly at an entire circumference in a circumferential direction, it may be formed at least at a part along the circumferential direction, or be intermittently formed at plural parts along the circumferential direction. As shown in FIG. 1 and FIG. 2, in the first bracket 19, a plurality, for example, 5 pieces of threaded holes 20 for fixing are provided at positions opposing the tapered surface 23a of the first separating plate 23 in a manner penetrating in the axial direction. These threaded holes 20 for fixing are provided to align on a circumference having the rotor shaft 8 as a center. The threaded holes 20 for fixing are provided at three positions on an upper half side than the axial center on the circumference, and two positions on a lower half side.

A tapered surface 24a having the rotor shaft 8 as a center is formed at a side surface on an outside of the second separating plate 24, and this tapered surface 24a configures a supporting surface. In the end plate 16, a plurality, for example, 5 pieces of threaded holes 18 for fixing are provided at positions opposing the tapered surface 24a in a manner penetrating in the axial direction. These threaded holes 18 for fixing are provided to align on the circumference having the rotor shaft 8 as the center. The threaded holes 18 for fixing are provided at three positions on the upper half side than the axial center on the circumference, and two positions on the lower half side. Note that these threaded holes 18 and 20 for fixing are not limited to five pieces, but may be increased or decreased in accordance with needs. Further, forming positions of the threaded holes for fixing may be at equal intervals in the circumferential direction, or may be at unequal intervals therealong.

Bolts 27 and 28 for fixing the rotor can respectively be screwed into the threaded holes 18 and 20 for fixing. The entirety of the rotor can be fixed to and supported on the case by screwing the bolts 27 and 28 into the threaded holes 18 and 20 for fixing, and pressing tip ends of the bolts 27 and 28 against the tapered surface 23a of the first separating plate 23 and the tapered surface 24a of the second separating plate 24.

Normally (during an operation of the electric motor), the bolts 27 and 28 for fixing are detached from the bracket 19 and the end plate 16. Alternately, the bolts 27 and 28 may be attached to the case in a state of being screwed in the threaded holes 18 and 20 for fixing without having the tip ends thereof make contact with the first and second separating plates 23 and 24. Further, normally (during the operation of the electric motor), dummy bolts that are much shorter than the bolts 27 and 28 may be screwed in the threaded holes 20 and 18 for fixing so as to protect the threaded holes for fixing and to prevent dust from entering from the threaded holes.

As shown in FIG. 2, the electric motor 10 is attached to the truck by fixing supporting arms 5a and 5b provided on the outer circumferential portion of the frame 17 to the truck frame 52. Further, the driving side end portion 8a of the rotor shaft 8 is coupled to the driving gear device by a joint.

Next, there will now be described summaries of performing renewal of the bearing lubricant grease of the electric motor 10 configured as described above and replacement of the bearings. As shown in FIG. 3, firstly, the bolts 27 for fixing the rotor are screwed into the plurality of threaded holes 20 for fixing provided in the bracket 19, and the tapered surface 23a formed on the first separating plate 23 is pressed by the bolts 27. At the same time, the bolts 28 for fixing the rotor are screwed into the plurality of threaded holes 18 for fixing provided in the end plate 16, and the tapered surface 24a formed on the second separating plate 24 is pressed by the bolts 28. By tightening the first separating plate 23 and the second separating plate 24 that are integral with the rotor from both sides in the axial direction by the bolts 27 and 28, the rotor is fixed to the case at its correct position, that is, by being positioned coaxially with the stator core 2, and retained at predetermined positions with respect to the axial direction of the stator.

Then, after having taken the bolt 25 off, the first bearing housing 21 is drawn out toward outside from the bracket 19, and the lubricant grease of the bearing outer race 6a attached to the inner circumference of the first bearing housing 21 is replaced with a new one. Similarly, the bolt 26 is taken off and the second bearing housing 22 is drawn out toward outside from the end plate 16, and the lubricant grease of the bearing outer race 7b attached to the inner circumference of the second bearing housing 22 is replaced with a new one. At this occasion, since the entirety of the rotor including the rotor shaft 8 is fixed and retained by the bolts 27 and 28, the entirety of the rotor is retained at the predetermined position with respect to the stator even when the first bearing housing 21 and the second bearing housing 22 are drawn out.

After having renewed the bearing grease, the first bearing housing 21 and the second bearing housing 22 are assembled to the bracket 19 and the end plate 16, and are fixed to the bracket 19 and the end plate by the bolts 25 and 26. Next, by taking the bolts 27 and 28 for fixing the rotor off from the case, or by loosening the same to the positions by which no contact is made with the first separating plate 23 and the second separating plate 24, the renewal of the lubricant grease is completed.

Further, the replacement of the bearings 6 and 7 can be performed in the same order as the above; after having disassembled the electric motor 10 as shown in FIG. 3, the bearing outer race 6a is detached from the first bearing housing 21 and a new bearing outer race is attached. Similarly, the bearing outer race 7a is detached from the second bearing housing 22 and a new bearing outer race is attached. Bearing inner races 6b and 7b attached to the rotor shaft 8 are detached from the rotor shaft 8 by using a jig, and thereafter new bearing inner races are attached to the rotor shaft 8.

Note that, in order to press the tapered surfaces 23a and 24a of the rotor to position the rotor at the correct position, preferably, three or more pieces of the bolts 27 and 28 for fixing the rotor may be provided on each side, and they may be provided at positions dispersed on the upper half side and the lower half side than the axial center on the circumference. In the present embodiment, three pieces are provided on the upper half and two pieces are provided on the lower half, and a number of the bolts on the upper half burdened with the weight of the rotor is made larger than that of the lower half.

In the electric motor 10 configured as above of the present embodiment, the renewal of the lubricant grease of the bearings and the replacement of the bearings can be performed without performing disassembly the electric motor in which the rotor has to be drawn out. Due to this, labor-saving for maintenance of the electric motor 10 can be achieved. The rotor can be retained at the predetermined position with respect to the stator, that is, at the predetermined position coaxially with the predetermined space and along the axial direction by the bolts for fixing the rotor. Due to this, positional displacement of the rotor caused by disassembling the bearing can be prevented, and operability can be improved, for a positional adjustment of the rotor upon reassembling the bearings becomes unnecessary.

Second Embodiment

Next, an electric motor according to the second embodiment will be explained. In the second embodiment, portions identical to those of the first embodiment will be given the same reference signs, and detailed explanations thereof will be omitted, and configurations that differ from the first embodiment will be explained in detail.

Figure 4:
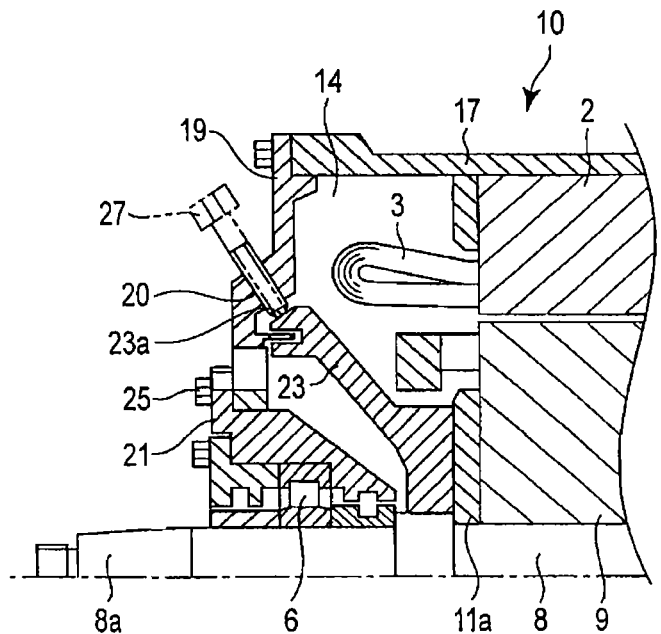
FIG. 4 is a cross sectional view showing a part of an electric motor of a second embodiment.

FIG. 4 is a longitudinal cross sectional view showing a part of a fully enclosed type electric motor of the second embodiment. As shown in FIG. 4, a bracket 19 is fixed to a driving side end of a frame 17, and a first bearing housing 21 in which a first bearing 6 is internally provided is attached on an inner circumferential side of the bracket 19. One end of a rotor shaft 8 is supported by the first bearing 6.

A first separating plate 23 is fixed to the rotor shaft 8 at one end side of a rotor core 9. A labyrinth structure configured of a minute annular space is formed between an outer circumferential portion side surface of the first separating plate 23 and the bracket 19.

A tapered surface 23a having the rotor shaft 8 as a center is formed on an outer circumferential surface of the first separating plate 23. A plurality of threaded holes 20 for fixing is provided on a circumference on a side surface of the bracket 19 at positions opposing the outer circumferential surface of the first separating plate 23. Each of the threaded holes 20 for fixing is formed to penetrate at an angle substantially perpendicular to the tapered surface 23a of the first separating plate 23.

The other end side of the rotor shaft 8 (opposite to a driving side) has similar configuration as the above driving side, or may have similar configuration as a side opposite to a driving side in the first embodiment.

According to the electric motor 10 configured as above, the rotor can be fixed and retained at a correct position by screwing the bolts 27 for fixing the rotor in the threaded holes 20 for fixing, and pressing the tapered surface 23a of the first separating plate 23. Since the rotor can be fixed by bolts for fixing even when bearings are taken off, renewal of a lubricant grease and replacement of the bearings can be performed without disassembling the electric motor at a large scale, as similar to the first embodiment.

Further, in the second embodiment, since the bolts 27 are pressed against the tapered surface 23a substantially perpendicular thereto, a bending force is not exerted on the bolts 27, so a size of the bolts can be made small. That is, even in the case of using bolts of a smaller size, the rotor can stably be fixed and retained. Further, since a surface pressure on the tapered surface of the first separating plate can be reduced, a surface will not be dented by the pressure even if a material of the first separating plate 23 has a relatively low hardness such as aluminum alloy.

Third Embodiment

Next, an electric motor according to the third embodiment will be explained. In the third embodiment, portions identical to those of the first embodiment will be given the same reference signs, and detailed explanations thereof will be omitted, and configurations that differ from the first embodiment will be explained in detail.

Figure 5:
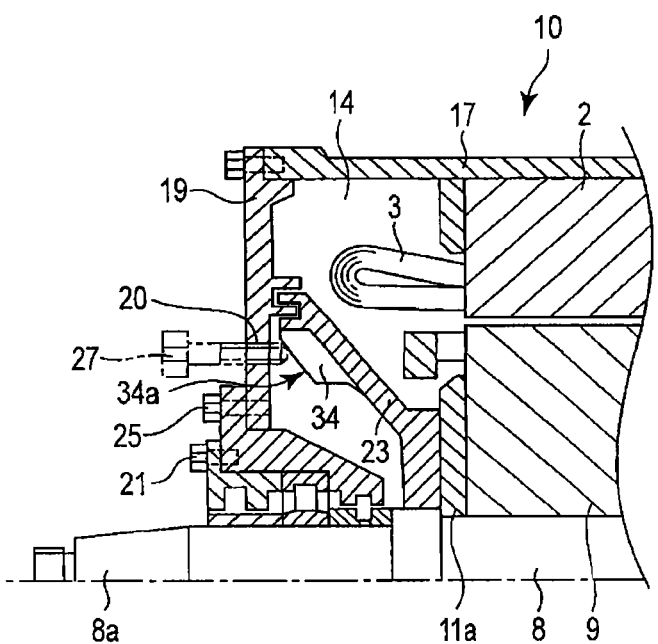
FIG. 5 is a cross sectional view showing a part of an electric motor of a third embodiment.
Figure 6:
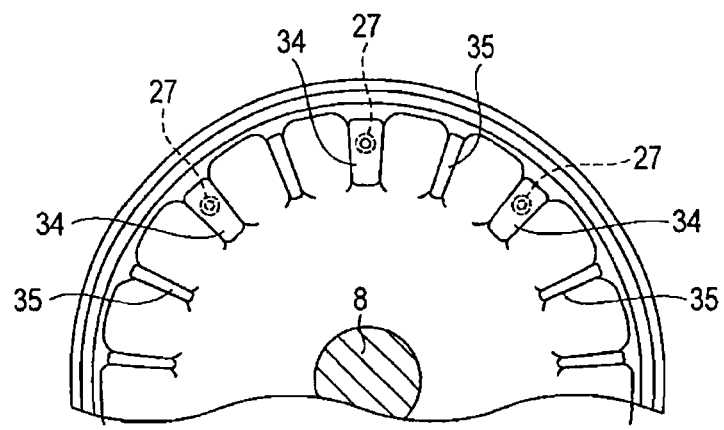
FIG. 6 is a front view showing a separating plate of the electric motor of the third embodiment.

FIG. 5 is a longitudinal cross sectional view showing a part of a fully enclosed type electric motor of the third embodiment, and FIG. 6 is a front view showing a side surface on an outside of a first separating plate. As shown in FIG. 5 and FIG. 6, a plurality of fins 34 and 35 is provided on a side surface on an outside of a first separating plate 23 attached to a rotor shaft 8. The fins 34 and 35 are arranged radiatingly with the rotor shaft 8 as a center, and are arranged alternately along a circumferential direction.

The plurality of fins 34 have tapered surfaces 34a having the rotor shaft 8 as a center. These tapered surfaces 23a configure supporting surfaces. A plurality of threaded holes 20 for fixing is formed at positions opposing the fins 34 on a side surface of a bracket 19, each of which penetrates the bracket in an axial direction. The plurality of threaded holes 20 for fixing is arranged aligning on a circumference having the rotor shaft 8 as a center. Further, the threaded holes 20 for fixing are arranged at positions on the same circumference as the tapered surfaces 34a of the fins 34 at substantially the same diameter.

The other end side of the rotor shaft (opposite to a driving side) has similar configuration as the above driving side, or may have similar configuration as a side opposite to a driving side in the first embodiment.

In an electric motor 10 configured as above, upon operation, flow of external air increases due to a fan effect of the fins 34 and 35 caused by a rotation of the first separating plate 23, and cooling effect is increased. At the same time, since a heat dissipating area of the first separating plate 23 is increased by the fins 34 and 35, cooling effect of a rotor further increases.

In cases of performing renewal of a bearing grease or replacement of bearings, the rotor can be fixed and retained by screwing bolts 27 for fixing the rotor in the threaded holes 20 for fixing, and pressing the tapered surfaces 34a of the fins 34. Due to this, a first bearing housing 21 and a second bearing housing can be drawn out without drawing the rotor out.

Since the fins 34 having the tapered surfaces 34a are arranged on the first separating plate 23 so as to correspond to the positions of the plurality of threaded holes 20 for fixing on the circumference provided on the bracket 19, the rotor can be fixed by the bolts 27 without any problem. Due to this, similar effects as that of the first embodiment can be achieved.

Fourth Embodiment

Next, a bolt for fixing a rotor in an electric motor of the fourth embodiment will be explained. In the fourth embodiment, portions identical to those of the first embodiment will be given the same reference signs, and detailed explanations thereof will be omitted, and configurations that differ from the first embodiment will be explained in detail.

Figure 7:
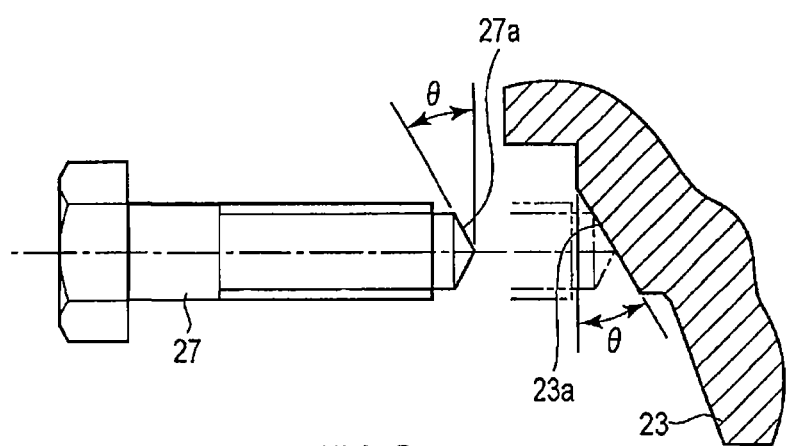
FIG. 7 is a side view partially showing a separating plate and a fixing bold of an electric motor of a fourth embodiment.

FIG. 7 shows the bolt for fixing the rotor and a first separating plate 23 of the electric motor of the fourth embodiment. A tapered surface 27a with an angle $\theta$ is formed at a tip end portion of the bolt 27. The taper angle $\theta$ of this tapered surface 27a is set to be identical to a taper angle $\theta$ of a tapered surface 23a formed on the first separating plate 23 on a rotor side.

When such a bolt 27 for fixing the rotor is pressed against the tapered surface 23a of the first separating plate 23, a contacting position of the bolt 27 and the tapered surface 23a is enlarged from a point to a line. Due to this, a position of a rotor can further be retained correctly. Further, since a surface pressure on contacting surfaces is reduced, dents caused by pressure, and the like can be prevented from being generated on the tapered surface.

Fifth Embodiment

Next, an electric motor of the fifth embodiment will be explained. In the fifth embodiment, portions identical to those of the first embodiment will be given the same reference signs, and detailed explanations thereof will be omitted, and configurations that differ from the first embodiment will be explained in detail.

Figure 8:
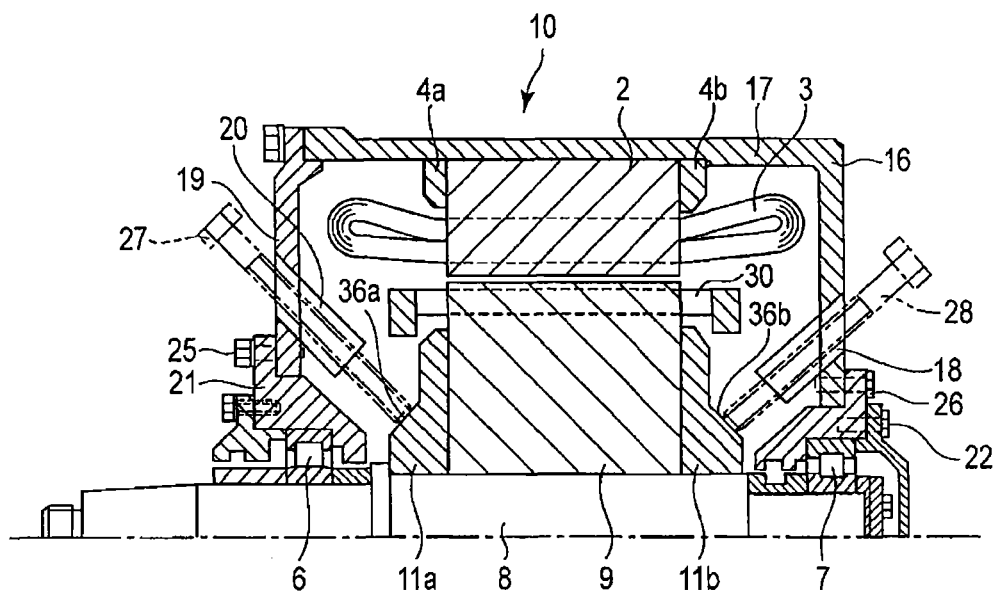
FIG. 8 is a cross sectional view showing an electric motor of a fifth embodiment.

FIG. 8 is a longitudinal cross sectional view showing a part of a fully enclosed type electric motor of the fifth embodiment. As shown in FIG. 8, a bracket 19 is fixed at a driving side end of a frame 17, and a first bearing housing 21 in which a first bearing 6 is internally provided is fixed by a bolt 25 at an inner circumferential side of the bracket 19. An end on a side opposite to the driving side end of the frame 17 is closed by an end plate 16. A second bearing housing 22 in which a second bearing 7 is internally provided is fixed by a bolt 26 at a center portion of the end plate. A rotor shaft 8 of a rotor is arranged in a case, and both end portions of the rotor shaft 8 are rotatably supported by the first bearing 6 and the second bearing 7.

In the fifth embodiment, a first separating plate and a second separating plate are not provided, and the case is formed as a sealed casing. A rotor core 9 and a pair of core holders 11a and 11b are attached to the rotor shaft 8. These core holders 11a and 11b are fixed to the rotor shaft 8, and configure a supporting body that integrally rotates with the rotor. Tapered surfaces 36a and 36b having the rotor shaft 8 as a center are respectively formed on outer circumferential surfaces of the core holders 11a and 11b. These tapered surfaces 36a and 36b configure a supporting surface.

In the bracket 19, a plurality of threaded holes 20 for fixing is provided at positions opposing the tapered surface 36a of the core holder 11a. These threaded holes 20 for fixing are provided to align on a circumference having the rotor shaft 8 as a center. Each of the threaded holes 20 for fixing is formed in a manner penetrating in a direction substantially perpendicular to the tapered surface 36a. Further, bolts 27 for fixing the rotor are configured to be capable of being screwed in the respective threaded holes 20 for fixing from an outside.

In the end plate 16, a plurality of threaded holes 18 for fixing is provided at positions opposing the tapered surface 36b of the core holder 11b. These threaded holes 18 for fixing are provided to align on a circumference having the rotor shaft 8 as a center. Each of the threaded holes 18 for fixing is formed in a manner penetrating in a direction substantially perpendicular to the tapered surface 36b. Further, bolts 28 for fixing the rotor are configured to be capable of being screwed in the respective threaded holes 18 for fixing from an outside.

According to an electric motor 10 configured as above, the rotor can be fixed and retained at a correct position by screwing the bolts 27 for fixing the rotor in the threaded holes 20 for fixing and thereby pressing the tapered surface 36a of the core holder 11a, and screwing the bolts 28 for fixing the rotor in the threaded holes 18 for fixing and thereby pressing the tapered surface 36b of the core holder 11b. Since the rotor can be fixed to a stator by the bolts 27 and 28 even when the first and second bearing housings 21 and 22 and the first and second bearings 6 and 7 are detached from the rotor shaft 8, renewal of a lubricant grease and replacement of bearings can be performed without disassembling the electric motor at a large scale, as similar to the first embodiment. Due to this, labor-saving for maintenance of the electric motor 10 can be achieved.

Further, in the fifth embodiment, since the bolts 27 and 28 are pressed against the tapered surfaces 36a and 36b at substantially perpendicular thereto, a bending force is not exerted on the bolts 27 and 28, so that sizes of the bolts can be made small. That is, even in the case of using bolts of smaller sizes, the rotor can stably be fixed and retained. Further, since surface pressures on the tapered surfaces of the core holders 11a and 11b can be reduced, surfaces will not be dented by the pressures even if materials of core holders have a relatively low hardness as in aluminum alloy and the like.

Sixth Embodiment

Next, an electric motor of the sixth embodiment will be explained. Although the first to fifth embodiments as explained above have explained about the fully enclosed type electric motors, the present invention is not limited to the fully enclosed type, and may be applied to an open-type self-ventilation cooling scheme electric motor.

The sixth embodiment shows the open-type self-ventilation cooling scheme electric motor. Note that, in the sixth embodiment, portions identical to those of the first embodiment will be given the same reference signs, and detailed explanations thereof will be omitted, and configurations that differ from the first embodiment will be explained in detail.

Figure 9:
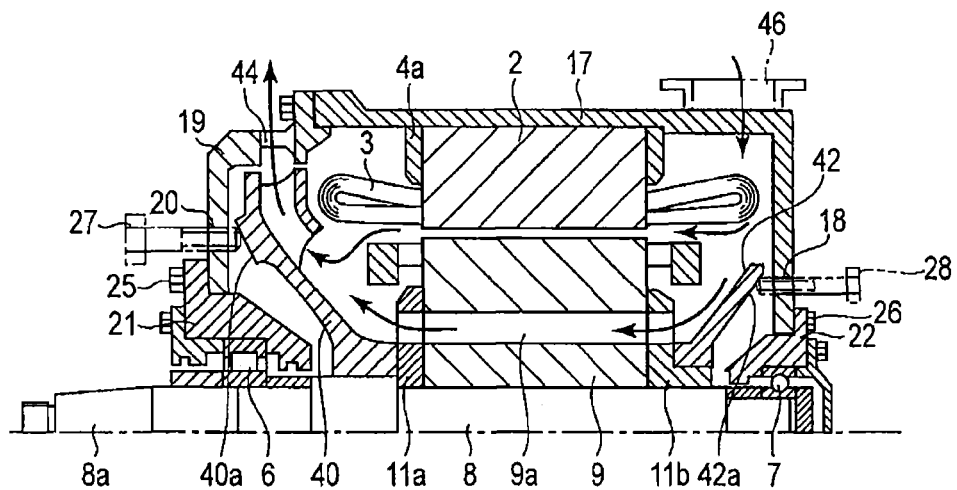
FIG. 9 is a cross sectional view showing an electric motor of a sixth embodiment.

FIG. 9 is a longitudinal cross sectional view showing the electric motor of the sixth embodiment. As shown in the drawing, a bracket 19 is fixed to a driving side end of a cylindrical frame 17, and a first bearing housing 21 in which a first bearing 6 is internally provided is attached by a bolt 25 at an inner circumferential side of the bracket 19. A side opposite to the driving side of the frame 17 is closed by an end plate 16. A second bearing housing 22 in which a second bearing 7 is internally provided is attached by a bolt 26 at a center portion of the end plate 16.

A rotor shaft 8 of a rotor is arranged in a case, and both end portions of the rotor shaft 8 are rotatably supported by the first bearing 6 and the second bearing 7. A rotor core 9 and a pair of core holders 11a and 11b are attached to the rotor shaft 8. A plurality of ventilation holes 9a respectively extending penetratingly in an axial direction is formed on the rotor core 9. A cylindrical stator core 2 is fixed to an inner circumferential surface of a frame 17, and is positioned coaxially with the rotor core 9 at an outer circumference thereof.

A ventilating fan 40 is attached to an end portion on a driving side of the rotor shaft 8, and is configured to be capable of integrally rotating with the rotor. The ventilating fan 40 configures a supporting body of the present invention. A tapered surface 40a having the rotor shaft 8 as a center is formed at a side surface facing outward from the ventilating fan 40, that is, a side surface opposing the bracket 19.

A funnel-shaped supporting body 42 is attached to an end portion on a side opposite to the driving side of the rotor shaft 8, and is configured to be capable of integrally rotating with the rotor. A tapered surface 42a having the rotor shaft 8 as a center is formed at a side surface facing outward from the supporting body 42, that is, a side surface opposing the end plate 16.

These tapered surfaces 40a and 42a are fixed to the rotor shaft 8, and configure a supporting surface formed on the supporting body that integrally rotates with the rotor.

In the bracket 19, a plurality of threaded holes 20 for fixing is provided at positions opposing the tapered surface 40a of the ventilating fan 40. These threaded holes 20 for fixing are provided to align on a circumference having the rotor shaft 8 as a center. Each of the threaded holes 20 for fixing is formed, for example, in a manner penetrating in an axial direction of a case. Further, bolts 27 for fixing the rotor are configured to be capable of being screwed in the respective threaded holes 20 for fixing from an outside.

In the end plate 16, a plurality of threaded holes 18 for fixing is provided at positions opposing the tapered surface 42a of the supporting body 42. These threaded holes 18 for fixing are provided to align on a circumference having the rotor shaft 8 as a center. Each of the threaded holes 18 for fixing is formed, for example, in a manner penetrating in the axial direction of the case. Further, bolts 28 for fixing the rotor are configured to be capable of being screwed in the respective threaded holes 18 for fixing from an outside.

In the bracket 19, a plurality of air discharging openings 44 is formed at positions opposing an outer circumferential portion of the ventilating fan 40. An air intaking opening 46 is formed at an end portion on a side opposite to the driving side of the frame 17.

During an operation of the electric motor, the ventilating fan 40 rotates integrally with the rotor. External air flows into the inside from the air intaking opening 46 of the frame 17 by the rotation of the ventilating fan 40, flows to the driving side through the ventilation holes 9a of the rotor core 9 and the space between the rotor core 9 and the stator core 2, and flows out to the outside from the air discharging openings 44 of the bracket 19 after having cooled the same.

According to the electric motor configured as above, the rotor can be fixed and retained at a correct position by screwing the bolts 27 for fixing the rotor in the threaded holes 20 for fixing and thereby pressing the tapered surface 40a of the ventilating fan 40, and screwing the bolts 28 for fixing the rotor in the threaded holes 18 for fixing and thereby pressing the tapered surface 42a of the supporting body 42. Since the rotor can be fixed to a stator by the bolts 27 and 28 even when the first and second bearing housings 21 and 22 and the first and second bearings 6 and 7 are detached from the rotor shaft 8, renewal of a lubricant grease and replacement of bearings can be performed without disassembling the electric motor at a large scale, as similar to the first embodiment. Due to this, labor-saving for maintenance of the self-ventilation cooling type electric motor can be achieved.

Note that the present invention is not limited to the embodiments described above, and upon implications, various modifications can be made thereto within a scope that does not go beyond an essence thereof. Further, the embodiments as above includes inventions at various stages, various inventions may be extracted therefrom according to appropriate combinations of a plurality of constituent features as disclosed. For example, even if some of the constituent features are deleted from an entirety of the constituent features shown in the embodiments, if the problem as described in the section of the technical problem can be solved, and the effect as described in the section of the advantageous effects of the invention can be achieved, the configuration in which these constituent features are deleted may be extracted as an invention.

This invention may be applied not only to electromagnetic induction motors, but also to magnetic motors. The numbers of the threaded holes for fixing and the bolts are not limited to the embodiments, and may be increased or decreased as needed.

What is claimed is:

1. An electric motor comprising:
   a stator;
   a frame supporting the stator;
   a bracket and an end plate configured to close respective ends of the frame;
   a first bearing housing and a second bearing housing respectively retaining bearings, and respectively fixed to the bracket and the end plate from an outside;
   a rotor shaft arranged inside the frame and rotatably supported by the bearings;
   a rotor attached to the rotor shaft and opposing the stator;
   a first supporting body and a second body attached to the rotor shaft at respective sides of the rotor and respectively including tapered supporting surfaces; and
   a plurality of threaded holes for fixing formed respectively in the bracket and the end plate to oppose the supporting surfaces, and into which a supporting member for fixing the rotor that presses the tapered supporting surfaces are configured to be insertable from outside,
   wherein the plurality of threaded holes are formed in a manner penetrating in a direction substantially perpendicular to the tapered supporting surface and extends into the frame towards the tapered supporting surface, and
   the supporting member is inserted in the plurality of threaded holes for fixing and presses each of the tapered supporting surfaces.

2. An electric motor according to claim 1, wherein the rotor comprises a rotor core attached to the shaft, and rotor core holders attached to the rotor shaft at respective sides of the rotor core and respectively including the supporting surfaces.

3. The electric motor according to claim 2, wherein the supporting surfaces of the core holders comprise tapered surfaces positioned at least at parts on a circumference having the rotor shaft as a center, and the plurality of threaded holes are formed in the bracket and the end plate so as to align on circumferences having the rotor shaft as centers.

* * * * *